No. 886,911. PATENTED MAY 5, 1908.
W. WOLTER.
VARIABLE SPEED GEAR.
APPLICATION FILED OCT. 4, 1907.
3 SHEETS—SHEET 1.
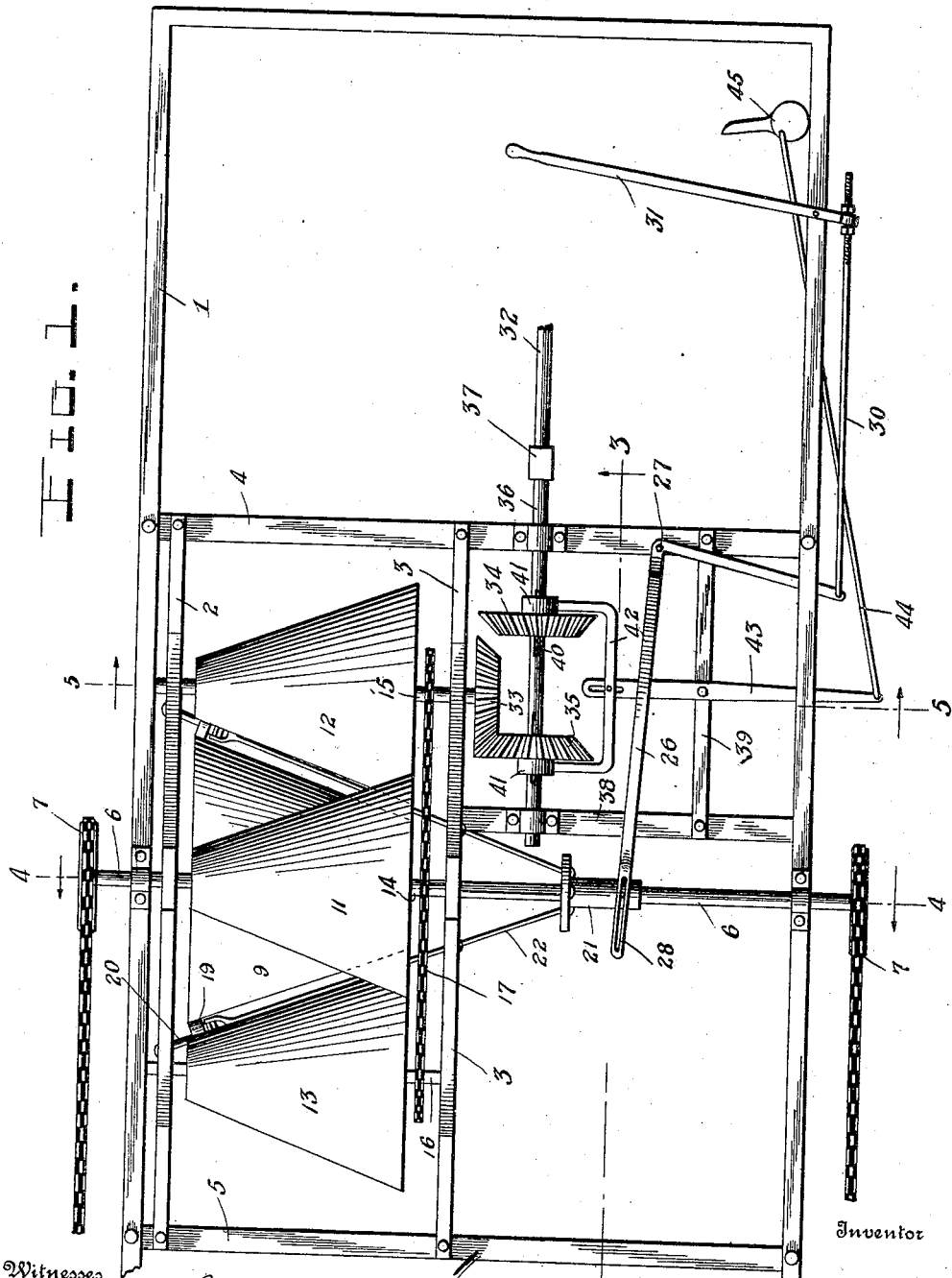

No. 886,911.
PATENTED MAY 5, 1908.
W. WOLTER.
VARIABLE SPEED GEAR.
APPLICATION FILED OCT. 4, 1907.
3 SHEETS—SHEET 2.
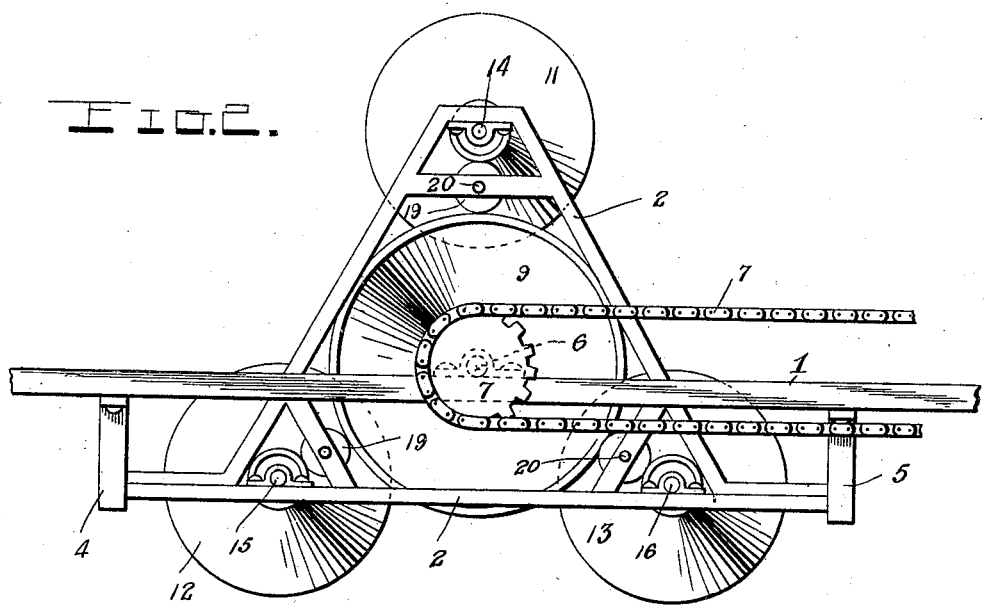
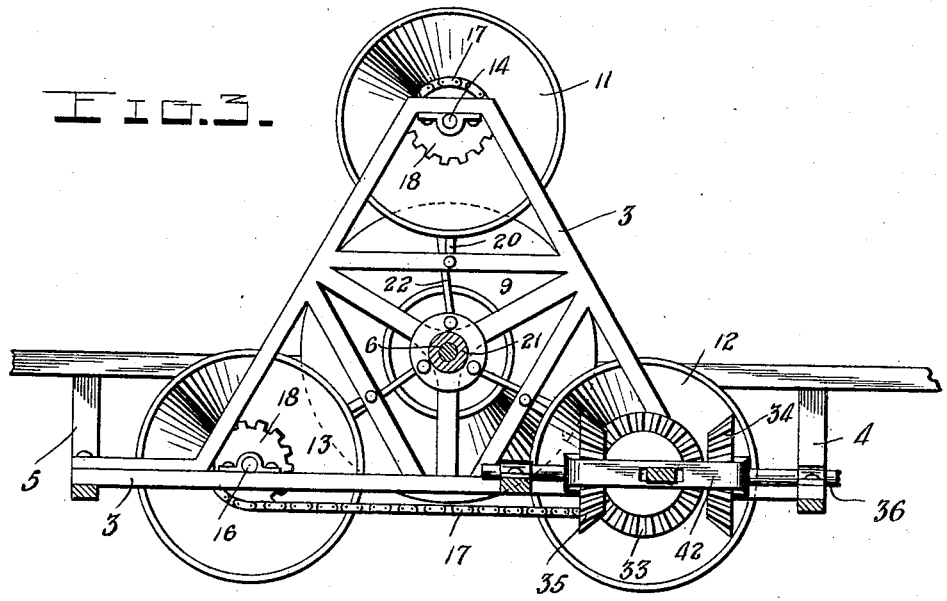

No. 886,911. PATENTED MAY 5, 1908.
W. WOLTER.
VARIABLE SPEED GEAR.
APPLICATION FILED OCT. 4, 1907.
3 SHEETS—SHEET 3.
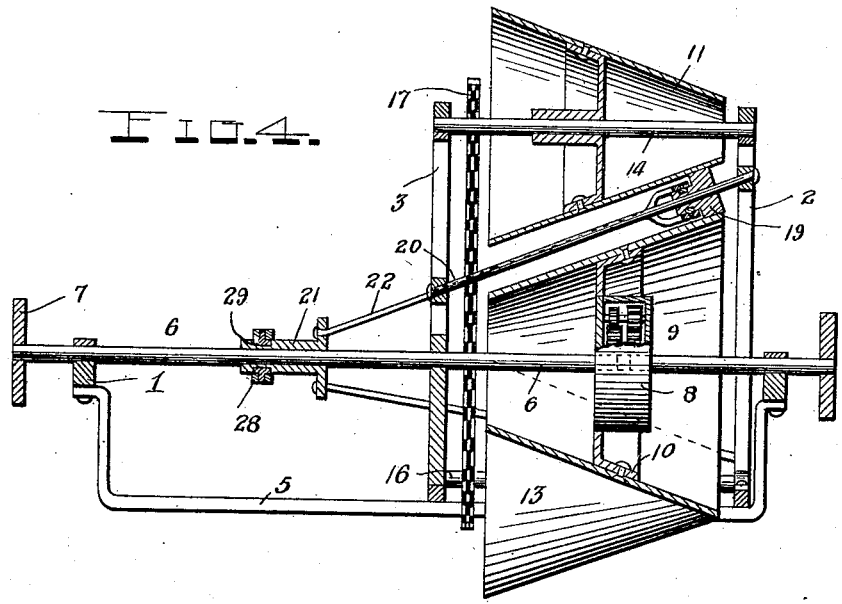
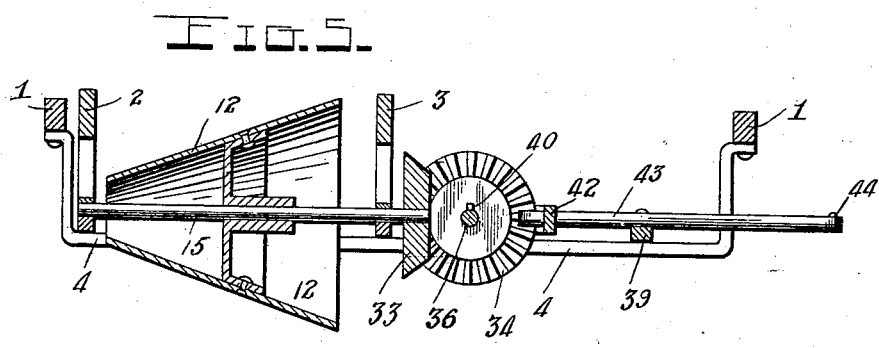
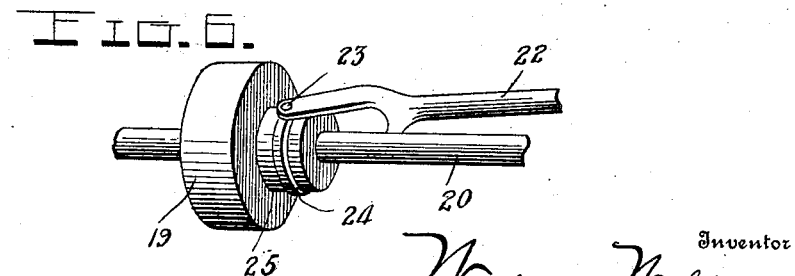
Witnesses
Chas. L. Griesbauer.
C. Rousseau.
Inventor
William Wolter
By Watson E. Coleman
Attorney
THE NORRIS PETERS CO., WASHINGTON, D. C.

UNITED STATES PATENT OFFICE.

WILLIAM WOLTER, OF BURRESS, NEBRASKA.

VARIABLE-SPEED GEAR.

No. 886,911.  Specification of Letters Patent.  Patented May 5, 1908.

Application filed October 4, 1907. Serial No. 395,901.

*To all whom it may concern:*

Be it known that I, WILLIAM WOLTER, a citizen of the United States, residing at Burress, in the county of Fillmore and State of Nebraska, have invented certain new and useful Improvements in Variable-Speed Gears, of which the following is a specification, reference being had to the accompanying drawings.

My invention relates to improvements in friction transmission gears for automobiles and other machinery.

The object of the invention is to provide a gear of this character by means of which the speed of the automobile or other machine may be varied without the shock and jar incident to the usual variable speed gears.

Further objects and advantages of the invention, as well as the structural features by means of which these objects and advantages are attained, will be made clear by an examination of the specification taken in connection with the accompanying drawings, in which Figure 1 is a top plan view of my improved variable speed friction gear showing it mounted upon the frame or body of an automobile; Fig. 2 is a side elevation of the same; Fig. 3 is a vertical longitudinal section taken on the plane indicated by the line 3—3 in Fig. 1; Figs. 4 and 5 are vertical transverse sections; and Fig. 6 is a detail view of one of the friction rollers or disks.

In the drawings 1 denotes a portion of the body or frame of an automobile upon which my improved gear is mounted. The gear is arranged in a frame consisting of two side members 2, 3 connected to front and rear cross bars 4, 5 arranged between the side bars or sills of the automobile frame 1. The side members 2, 3 of the gear frame as here shown are of substantially triangular form and to allow the gear to sit sufficiently low in the frame 1 the cross bars or hangers 4, 5 have their central portions dropped as seen in Figs. 4 and 5.

Journaled in suitable bearings upon the side bars or sills of the frame 1 and in a bearing in the center of the side piece 3 is a transverse shaft 6 which I will term the drive shaft. The latter has its projecting ends connected by a sprocket chain gearing 7 or by any other suitable drive connections to the drive wheels (not illustrated) of the automobile. While the driven shaft 6 may be made in one piece I preferably construct it in two sections and unite said sections by a differential gear 8 of any suitable form and construction. The differential gear 8 carries a driven cone 9 which is preferably constructed of sheet metal and united to said gear by forming the casing of the latter with an inclined annular flange 10 which fits within and is riveted to said cone as clearly shown in Fig. 4. Also arranged between the side pieces 2, 3 and around the cone 9 are a plurality of drive cones 11, 12, 13 fixed upon drive shafts 14, 15, 16 journaled in suitable bearings in the corners of the triangular side pieces 2, 3 as shown. The drive cones are smaller but similar in construction to the driven cone and each consists of a shell riveted to the flange of a hub suitably fixed upon one of said drive shafts. The three drive shafts are connected together for simultaneous movement in any suitable manner but preferably by providing a sprocket chain 17 which is passed around the sprocketwheels 18 fixed to the said shafts between the large ends of the drive cones and the side piece 3.

The motion of the drive cones is imparted to the driven one by a plurality of rollers or disks 19 arranged between said cones and mounted for both sliding and rotary movement upon shafts or rods 20. The latter extend between the drive and driven cones, which it will be noted are oppositely disposed, and have their ends fixed in the side pieces 2, 3 so as to connect them and brace them apart. Said disks are shifted simultaneously lengthwise of the cones for the purpose of varying the speed of the driven shaft, by operating a sliding sleeve 21 mounted on said driven shaft 6 and connected to the disks by rods or links 22. Each of the links 22 has its outer end pivoted to a flange on one end of the sleeve or operating element 21 and its inner end is bifurcated to provide spaced arms which are pivoted as indicated at 23 at diametrically opposite points on a ring 24 arranged for rotation in an annular groove formed in the head 25 of one of the disks 19 as more clearly shown in Fig. 6. While any suitable means may be provided for shifting the sleeve 21 to control the movement of the driven cone I preferably employ a bell crank 26 which is pivoted at its angle as at 27 upon the front hanger 4. One arm of the bell crank 26 is bifurcated to provide arms 28 which are pivoted at diametrically opposite points upon a ring 29 set for rotation in a groove in the sleeve 22 as shown in Fig. 1.

The other arm of the bell crank is connected by an adjustable rod or link 30 to a hand lever 31 or any other suitable operating device.

The drive shafts are operated by connecting one of them to the shaft 32 of the engine or motor (not illustrated) of the automobile, and in order to permit the motion of the gear to be quickly reversed without reversing the engine I preferably employ a reversing and driving gear shown in Fig. 1. This device consists in providing upon an extended end of one of the drive shafts a beveled gear 33 which is adapted to be engaged by either one or the other of two beveled gears 34, 35 mounted upon a shaft 36 which is connected by a suitable coupling 37 to the engine shaft 32. The shaft 36 is mounted in suitable bearings upon the hanger 4 and a cross bar 38 arranged between one of the sills 1 and the cross piece 3 and connected by a brace bar 39 to the hanger 4. The gears 34, 35 are adapted to slide freely on the shaft 36 and are keyed to the same for rotation therewith as shown at 40. Their hubs are rotatably mounted in the arms 41 of a yoke 42 which is adapted to be operated by a lever 43. This lever 43 is pivoted intermediate its ends upon the bar 39 and has its inner end loosely connected to the yoke 42 as seen in Fig. 1. The opposite end of the lever 43 is connected by a link or rod 44 to a lever 45 or any other suitable operating element.

The construction, operation and advantages of the invention will be readily understood from the foregoing description taken in connection with the accompanying drawings and the following brief statement. It will be seen that when the engine is in motion the shaft 36 will be rotated and one of the beveled gears upon it will rotate the gear 33. Since the latter is upon one of the drive shafts and said drive shafts are connected together by a sprocket chain gearing 17, 18, the three drive cones will be simultaneously operated and their motion will be imparted to the driven cone 9 through the medium of the disks or rollers 19. The motion of the driven shaft 6 is imparted to the drive or traction wheels of the automobile by the sprocket chain gearings 7 as before mentioned. By shifting the lever 31 the sleeve 21 will be moved longitudinally upon the shaft 6 and the disks 19 will be simultaneously shifted endwise or lengthwise of the cones so that the speed of the driven shaft 9 may be readily varied. Owing to the arrangement of the driven and drive cones and the disks between them it will be seen that there will be no shock or jar incident to a change in speed, and that when the disks 19 are moved outwardly toward the small ends of the drive cones they will leave the large end of the driven cone and cease to impart motion to the latter. This feature allows the machine to be started or stopped by the gear and dispenses with the necessity of a clutch. It will be noted that the machine may be started from the lowest speed without slowing down the motor or engine and that there will be no shock or jar when the disks move into and out of engagement with the large end of the driven cone. In this connection it will also be noted that when the lever is shifted to produce a low speed the action of the disks between the cones will serve as a brake and the machine will be almost at a standstill before the disks leave the face of the driven cone. The lever 31 therefore gives the operator full control of the machine since by properly operating it he can start or stop the machine and increase or decrease the speed of the same without stopping the engine or altering the speed of the same. By operating the lever 45 either of the beveled gears 34, 35 will move into mesh with the gear 33 so that the motion of the gear may be quickly and easily reversed without changing the direction of the motion of the engine.

While I have shown and described my invention as embodied in a gear used upon an automobile, it will be understood that the gear may be adapted for use upon a machine of any description. It will also be understood that I do not wish to be limited to the preferred embodiment of the invention herein set forth, since variations in the form, proportion and minor details of construction, such for instance as the number and arrangement of the drive cones, may be made without departing from the spirit or sacrificing any of the advantages of the invention.

Having thus described my invention what I claim is:

1. In a friction transmission gear, a driven shaft, and plurality of driving shafts arranged around the same, a cone upon the driven shaft, oppositely disposed cones upon the driving shafts, interposed disks between said cones, and means for shifting said disks longitudinally of the cones, substantially as described.

2. In a friction transmission gear, a driven shaft, and plurality of driving shafts arranged around the same, a cone upon the driven shaft, oppositely disposed cones upon the driving shafts, shafts arranged between said driven and driving shafts, rotary disks arranged for sliding movement on the last mentioned shafts, a slidable sleeve upon the driven shaft and connections between said sleeve and said disks, substantially as described.

3. In a friction transmission gear, a supporting frame, a centrally arranged driven shaft therein, a plurality of driving shafts arranged in said frame around the driven shaft, a cone upon the driven shaft, oppositely disposed cones upon the driving shafts, intermediate shafts between the driving and driven shafts, rotary disks slidably arranged upon said intermediate shafts, means for shifting said disks longitudinally of said cones, driving connections between said driving shafts, and means for rotating one of said driving shafts in either direction, substantially as described.

4. In a friction transmission gear, a supporting frame, a centrally arranged driven shaft therein, a plurality of driving shafts arranged in said frame around the driven shaft, a cone upon the driven shaft, oppositely disposed cones upon the driving shafts, intermediate shafts between the driving and driven shafts, rotary disks slidably arranged upon said intermediate shafts, a sliding sleeve upon the driven shaft, operating rods between said sleeve and said disks, a lever operating said sleeve, sprocket chain gearing connecting the said driving shafts, and means for rotating one of said driving shafts in either direction, substantially as described.

5. In a friction transmission gear, a driven shaft having two sections, a differential gear uniting said sections, a driven cone carried by said differential gear, drive shafts, drive cones arranged upon said shafts and around the driven cone, sprockets upon said drive shafts, a chain surrounding said sprockets, a sleeve sliding on the driven shaft, intermediate shafts between the drive and driven cones, disks engaged with said cones and slidable upon said intermediate shafts, rods connecting said disks and said sleeve, a lever for operating said sleeve, means for operating said lever, a reversible drive gear connected to one of the drive shafts and means for controlling said reversible drive gear, substantially as described.

6. In a friction transmission gear, a driven shaft, a plurality of drive shafts, a cone upon the driven shaft, oppositely disposed cones upon the driving shafts, shafts arranged between said driven and driving shafts, rotary disks arranged for sliding movement upon the last mentioned shafts and adapted to frictionally engage said cones, means for shifting said disks simultaneously upon their shafts, driving connections between said driving shafts and means for rotating one of said driving shafts in either direction.

In testimony whereof I hereunto affix my signature in presence of two witnesses.

WILLIAM WOLTER.

Witnesses:
   Wm. S. Ford,
   H. H. Stolltz.